US005973717A

United States Patent [19]

Kerr et al.

[11] Patent Number: 5,973,717

[45] Date of Patent: Oct. 26, 1999

[54] ADJUSTABLE LEAD SCREW FOR CHANGING RESOLUTION AND FOR STATION-TO-STATION, MACHINE-TO-MACHINE, OR SWATH-TO-SWATH CORRECTIONS

[75] Inventors: Roger S. Kerr, Brockport; Seung Ho Baek, Pittsford, both of N.Y.

[73] Assignee: Eastman Kodak Company, Rochester, N.Y.

[21] Appl. No.: 09/060,605

[22] Filed: Apr. 15, 1998

[51] Int. Cl.[6] .................... G11B 21/08

[52] U.S. Cl. .................... 347/234; 346/139 D; 347/8; 347/37

[58] Field of Search .................... 346/139 D; 347/284, 347/8, 37; 400/56

[56] References Cited

U.S. PATENT DOCUMENTS

| | | | |
|---|---|---|---|
| Re. 33,661 | 8/1991 | Baheri . | |
| 4,270,155 | 5/1981 | Bejerano | 360/106 |
| 4,313,143 | 1/1982 | Zarr | 360/106 |
| 4,747,004 | 5/1988 | Kukreja et al. | 360/106 |
| 5,268,708 | 12/1993 | Harshbarger et al. | 340/134 |

*Primary Examiner*—N. Le
*Assistant Examiner*—Lamson D. Nguyen
*Attorney, Agent, or Firm*—Milton S. Sales

[57] ABSTRACT

The present invention is for an image processing apparatus (10) for sheet thermal print media. The image processing apparatus (10) comprises a vacuum imaging drum (300) for holding thermal print media (32) and dye donor material (36) in registration on the vacuum imaging drum (300). A print head (500), mounted on a translation stage member (220) that is moved by a lead screw (250) moves along a line parallel to the longitudinal axis (301) of the vacuum imaging drum (300) as the vacuum imaging drum (300) rotates. The print head (500) receives information signals and produces radiation which is directed to the dye donor material (36) which causes color to transfer from the dye donor material (36) to the thermal print media (32). To adjust for different imaging resolutions and swath widths, the lead screw (250) can be mounted so that it is in parallel with the vacuum imaging drum or its mounting can be offset from parallel to change, based on the offset angle, the actual speed of the translation stage member (220) on which the print head (500) is mounted. This adjustment also allows compensation for station-to-station variance within the same multi-station image processing apparatus as well as for machine-to-machine differences.

9 Claims, 6 Drawing Sheets

ADJUSTABLE LEAD SCREW FOR CHANGING RESOLUTION AND FOR STATION-TO-STATION, MACHINE-TO-MACHINE, OR SWATH-TO-SWATH CORRECTIONS

FIELD OF THE INVENTION

This invention relates to image processors in general and in particular to a laser printer having the capability to accurately adjust its linear translation mechanism relative to the image plane for the purpose of precisely adjusting the resolution of the intended image, as well as for the purpose of improving the consistency of resolution of the intended image, images machine-to-machine or, in the case of a press, station-to-station.

BACKGROUND OF THE INVENTION

U.S. Pat. No. 5,268,708 discloses an image processing apparatus having half-tone color proofing capabilities. This image processing apparatus is arranged to form an intended image on a sheet of thermal print media by transferring dye from a sheet of dye donor material to the thermal print media by applying a sufficient amount of thermal energy to the dye donor material to form an intended image. After the dye donor material is secured to the periphery of a vacuum imaging drum, a scanning subsystem or write engine provides the scanning function. This is accomplished by retaining the thermal print media and the dye donor material on the imaging drum while the drum is rotated past a print head that will expose the thermal print media. A translation drive then traverses the print head axially along the imaging drum, in coordinated motion with the rotating imaging drum. These movements combine to produce the intended image on the thermal print media. A scanning subsystem or write engine provides the scanning function by generating a once per revolution timing signal to data path electronics as a clock signal while the translation drive traverses the print head axially along the imaging drum in a coordinated motion with the imaging drum rotating past the print head. This is done with positional accuracy maintained, to allow precise control of the placement of each pixel, in order to produce the intended image on the thermal print media.

Although the presently known and utilized image processing apparatus is satisfactory, it is not without drawbacks. Image resolution (that is, dots imaged per inch) cannot readily be changed with existing designs. The ability to vary image resolution slightly is an advantage in that it can help to alleviate banding, moire, and other imaging effects that may occur in an image when that image is reproduced at a specific resolution. Slight changes to resolution can eliminate these effects without objectionable changes to overall image reproduction.

With existing systems, the slow scan speed, at which the print head moves along the writing drum, is fixed. As a result, the range of imaging resolutions that can be achieved using existing methods is limited, at best, to a small set of fixed values. These values are themselves dependent on maintaining stringent manufacturing and performance tolerances in components used to assemble the system. This effectively increases the complexity of manufacture, increases cost, and limits how well imaging systems can reproduce their intended targets.

Existing systems achieve their target resolutions using a precise coordination of dimensional and timing factors at the writing interface. Dimensional factors include pixel-to-pixel distance (chiefly a function of print head optics and laser diode arrangement), number of lasers used (which, in turn, determines the swath width), pitch of the lead screw, and writing drum circumference. Timing factors include drum rotation speed and the linear motion of the print head as it moves along the writing drum. Each of these above named factors are tightly coupled and are highly inter-dependent. Taken together, these factors determine the addressability of individual points on the imaging surface, thereby determining what resolution values are achievable for the image processing system.

The tight coupling of the dimensional and timing factors listed above makes it difficult to adapt an image processing system of this type for different resolutions and for different swath widths. To change from one resolution to another, or from one swath width to another, requires corresponding changes in more than one of the factors listed above. Certain of these factors are fixed and cannot be changed once the image processing apparatus is built. For example, the writing drum circumference and the pitch of the lead screw are fixed. Changing any of the other factors requires corresponding changes to effect the intended output resolution. For example, changing the laser spacing or number of lasers that write simultaneously changes the swath width and requires corresponding changes to the linear motion of the print head along the vacuum imaging drum.

The print head linear motion is itself a factor of the rotational speed of the drive motor for the lead screw and lead screw pitch. However, the capability to vary this speed for precision operation over a range of values requires an expensive motor and it can be difficult to maintain consistent results using this method.

As a result of these tightly coupled factors, the ability to alter the imaging resolution and swath width for multiple values requires the ability to adjust both dimensional and timing characteristics of the image processing apparatus.

The above description applies for an image processing apparatus that uses a single station for imaging. However, this same design can be extended to cover an image processing device that utilizes more than one imaging station, such as a printing press, where each station images using a different color. With such a design, it is important that each station be properly adjusted to provide accurate registration in reproducing successive color separations. Minor tolerance differences in head positioning can lead to objectionable effects and registration errors in the output image, since swath width errors are additive along the path of the print head.

There are additional concerns for variation in head traversal between imaging machines. Separate image processing machines at the same site need to be adjusted so that they provide similar registration and results for the same image. Manufacturing tolerances prevent two machines from providing precise positioning relative to each other without some method for fine-tuning the head traversal mechanism.

The overall method of using a lead screw mechanism for tight control of writing component positioning is well-known in the art. In particular, systems that use magnetic read/write heads use lead screw mechanisms (for example, see U.S. Pat. No. 4,270,155, U.S. Pat. No. 4,313,143, and U.S. Pat. No. 4,747,004). Existing patents also show the use of the guide rod mechanism in conjunction with the lead screw for maintaining proper head alignment and positioning that compensates for lead screw tolerance differences (see U.S. Pat. No. RE:33,661).

DISCLOSURE OF THE INVENTION

It is the object of the present invention to allow precise adjustment for variable imaging resolution from print-toprint, station-to-station within the same machine, or machine-to-machine by changing the angle of the linear system's lead screw relative to the axis of the vacuum imaging drum, thereby changing the print head's linear motion.

It is an advantage of the present invention that it allows a straightforward method for making small changes to the linear motion of the print head as it moves along the writing drum axis, effectively allowing this part of the imaging system to adapt to a wide range of different resolutions and different swath widths.

It is an advantage of the present invention that it allows movement of the print head to be precisely adjusted to compensate for tolerance differences in lead screw fabrication as well as to compensate for minor variations in the lead screw drive motor.

It is an advantage of the present invention that it allows a change in linear motion of the print head that can be easily calculated, using a simple trigonometric (cosine) ratio.

It is an advantage of the present invention that it provides a straightforward mechanical adjustment for effecting very precise changes to print head traversal speed without requiring any change in the lead screw or in its drive motor.

It is an advantage of the present invention that it can work with existing designs for the writing drum and for imaging support subsystems without major redesign of existing systems.

It is an advantage of the present invention that it allows a method for precise adjustment of print head movement so that individual stations within the same machine can be adjusted to minimize station-to-station differences.

It is an advantage of the present invention that it allows a method for precise adjustment of print head movement so that the behavior of one image processing apparatus can be closely matched to the behavior of a similar image processing apparatus.

The present invention is directed to overcoming one or more of the problems set forth above. Briefly summarized, according to one aspect of the present invention, the invention provides a lead screw drive mechanism that operates at an angle relative to the print head translation path to thereby effectively changes the speed of the print head in its path along the drum, allowing adjustment of head translation for a range of different image resolutions, swath widths, and swath-to-swath dimensions without altering the drive motor speed. Making the angular adjustment variable over a range of angles allows fine-tuning of image resolution and swath-to-swath dimensions with a single mechanical adjustment. This allows adjustment of print head movement at different stations within an image processing device, so that each station provides the same print head movement, thus compensating for expected tolerance differences between support components for image processing at each station. This also allows adjustment of print head movement to calibrate this movement machine-to-machine.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art. While the invention is described below in the environment of a laser thermal printer, it will be noted that the invention can be used with other types of scanning printers.

Figure 1:
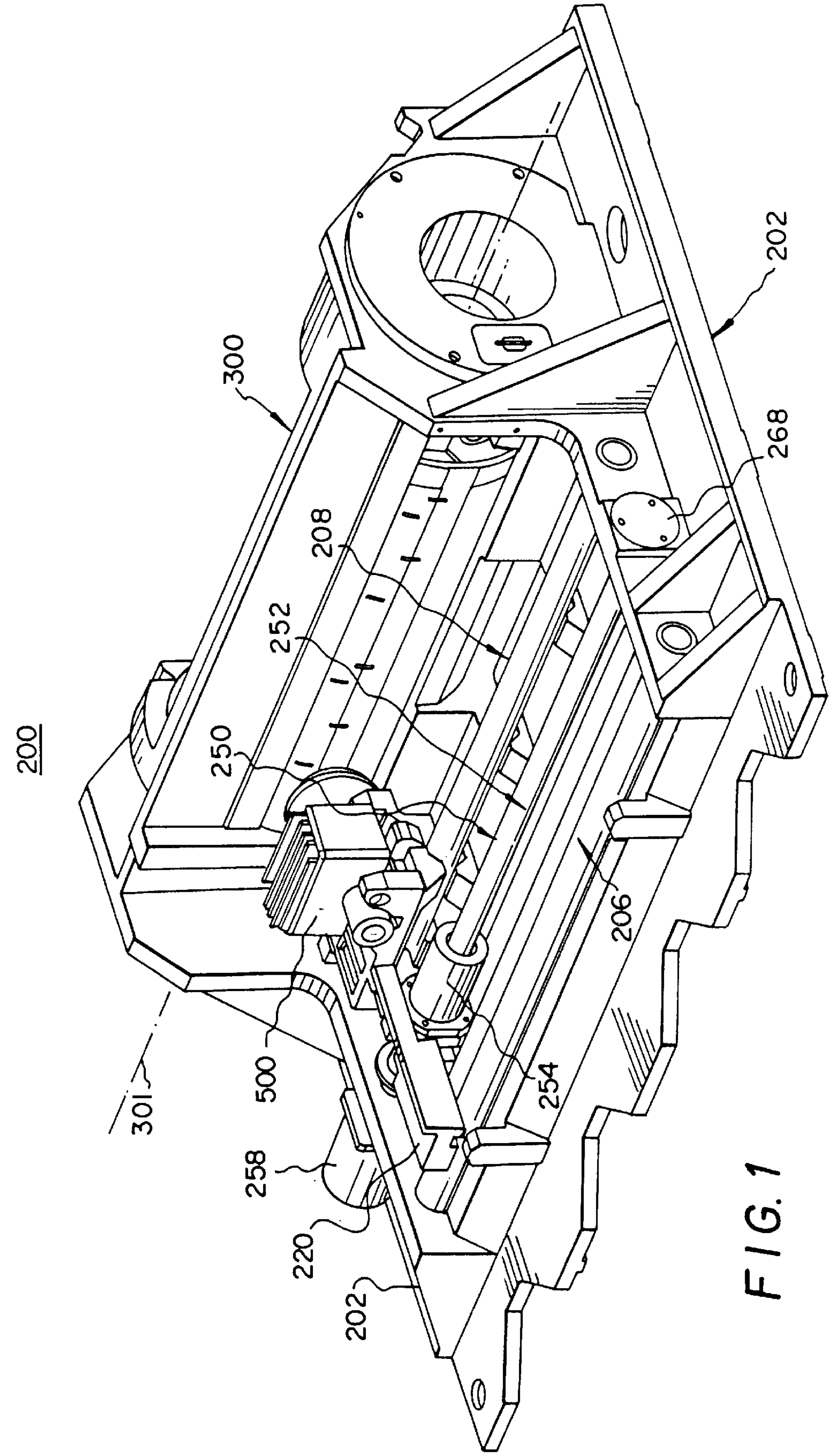
FIG. 1 is a perspective view of the lathe bed scanning subsystem or write engine of the present invention.

Referring to FIG. 1, there is illustrated a perspective view of a lathe bed scanning subsystem 200 of an image processing apparatus, including a vacuum imaging drum 300, a print head 500 and a lead screw 250 assembled in a lathe bed scanning frame 202. Vacuum imaging drum 300 is mounted for rotation about an axis 301 in lathe bed scanning frame 202. Print head 500 is movable with respect to vacuum imaging drum 300, and is arranged to direct a beam of light to a dye donor sheet material. The beam of light from print head 500 is modulated individually by modulated electronic signals from an image processing apparatus so that the color on the dye donor sheet material is heated to cause volatilization only in those areas in which its presence is required on thermal print media 32 to reconstruct the shape and color of the original image.

The print head includes a plurality of laser diodes which are coupled to the print- head by fiber optic cables which can be individually modulated to supply energy to selected areas of the thermal print media in accordance with an information signal. The print head of the image processing apparatus includes a plurality of optical fibers coupled to the laser diodes at one end and the other end to a fiber optic array within the print head. The print head is movable relative to the longitudinal axis of the vacuum imaging drum. The dye is transferred to the thermal print media as the radiation, transferred from the laser diodes by the optical fibers to the print head and thus to the dye donor material, is converted to thermal energy in the dye donor material.

Using a plurality of laser diodes allows faster throughput, since multiple diodes can write imaging signals simultaneously. The print head writes using multiple lasers at a time, so that it writes the image onto the receiving medium (which is mounted on the imaging drum) as a series of adjacent, parallel swaths.

Print head 500 is mounted on a movable translation stage member 220 which, in turn, is supported for low friction slidable movement on translation bearing rods 206 (rear) and 208 (front). Translation bearing rods 206 and 208 are as sufficiently rigid as possible so as not to sag or distort between their mounting points and are arranged as parallel as possible with axis 301 of vacuum imaging drum 300 in order to maintain the axis of print head 500 so that it is perpendicular to axis 301 of vacuum imaging drum 300. Front translation bearing rod 208 locates translation stage member 220 in the vertical and the horizontal directions with respect to axis 301 of vacuum imaging drum 300. Rear translation bearing rod 206 locates translation stage member 220 only with respect to rotation of translation stage member 220 about front translation bearing rod 208 so that there is no over-constraint condition of translation stage member 220 which might cause it to bind, chatter, or otherwise impart undesirable vibration or jitters to print head 500 during the generation of an intended image.

The translation drive is for permitting relative movement of the print head by synchronizing the motion of the print head and stage assembly such that the required movement is made smoothly and evenly throughout each rotation of the drum. A clock signal generated by a drum encoder provides the necessary reference signal accurately indicating the position of the drum. This coordinated motion results in the print head tracing out a helical pattern around the periphery of the drum. The above mentioned motion is accomplished by means of a dc. servo motor and encoder which rotates a lead screw that is, typically, aligned parallel with the axis of the vacuum imaging drum. The print head is placed on the translation stage member in a "V" shaped groove, which is formed in the translation stage member, which is in precise positional relationship to the bearings for the front translation stage member supported by the front and rear translation bearing rods. The translation bearing rods are positioned parallel to the vacuum imaging drum, so that the print head automatically adopts the preferred orientation with respect to the surface of the vacuum imaging drum. The print head is selectively locatable with respect to the translation stage member, thus it is positioned with respect to the vacuum imaging drum surface. By adjusting the distance between the print head and the vacuum imaging drum surface, as well as angular position of the print head about its axis using adjustment screws, an accurate means of adjustment for the print head is provided. Extension springs provide a loading force against these two adjustment means. The translation stage member and print head are attached to a rotatable lead screw (having a threaded shaft) by a drive nut and coupling. The coupling is arranged to accommodate misalignment of the drive nut and lead screw so that only rotational forces and forces parallel to the lead screw are imparted to the translation stage member by the lead screw and drive nut. The lead screw rests between two sides of the lathe bed scanning frame of the lathe bed scanning subsystem or write engine, where it is supported by deep groove radial bearings. At the drive end the lead screw continues through the deep groove radial bearing, through a pair of spring retainers, that are separated and loaded by a compression spring to provide axial loading, and to a DC. servo drive motor and encoder. The DC. servo drive motor induces rotation to the lead screw moving the translation stage member and print head along the threaded shaft as the lead screw is rotated. The lateral directional movement of the print head is controlled by switching the direction of rotation of the DC. servo drive motor and thus the lead screw.

Figure 2:
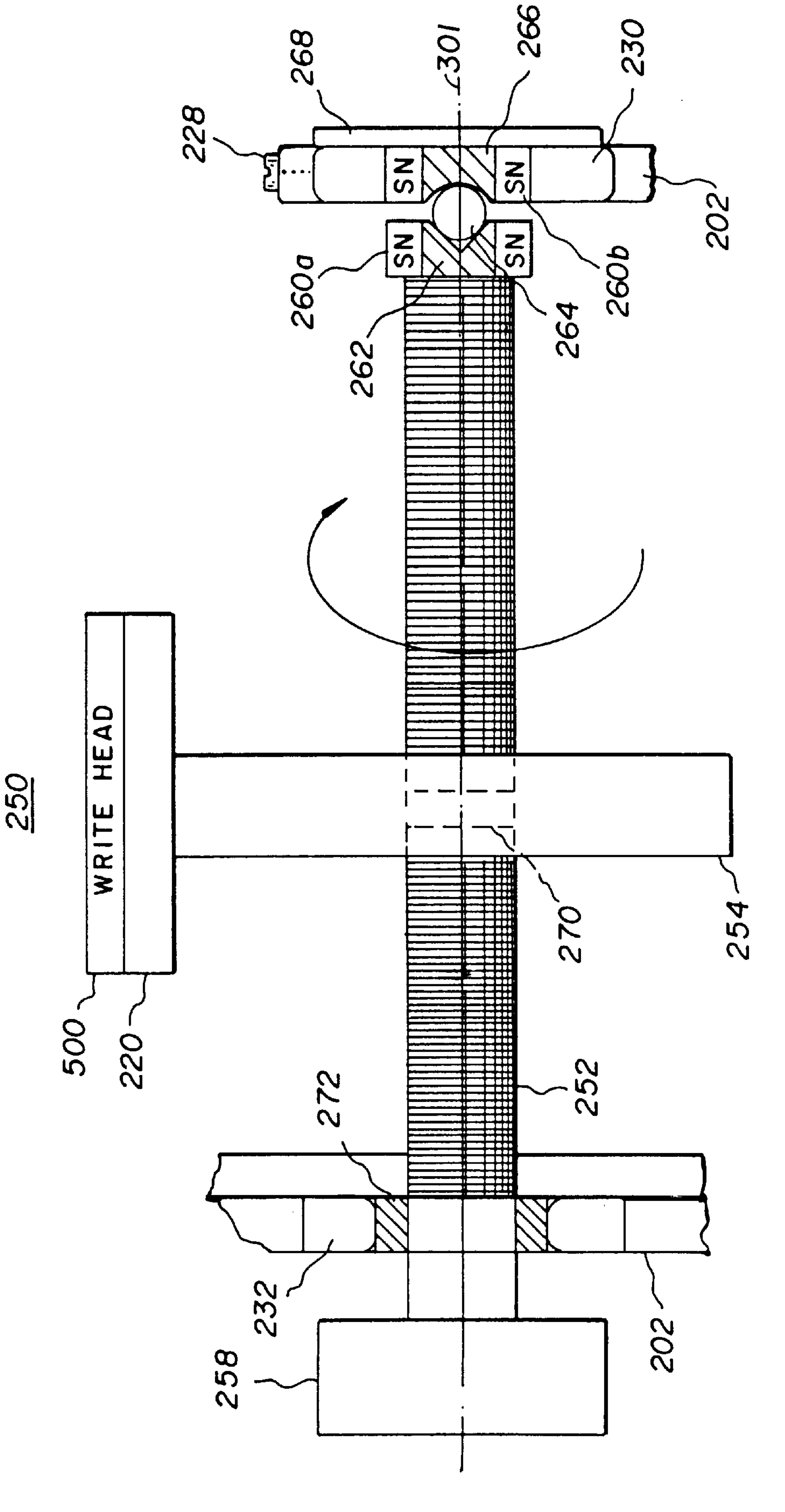
FIG. 2 is a top view in horizontal cross section, partially in phantom, of the lead screw of the present invention.

Referring to FIGS. 1 and 2, a lead screw 250 is shown which includes an elongated, threaded shaft 252 which is attached to a linear drive motor 258 on its drive end and to lathe bed scanning frame 202 by means of a radial bearing 272. A lead screw drive nut 254 includes grooves in its hollowed-out center portion 270 for mating with the threads of threaded shaft 252 for permitting lead screw drive nut 254 to move axially along threaded shaft 252 as threaded shaft 252 is rotated by linear drive motor 258. Lead screw drive nut 254 is integrally attached to the to print head 500 through lead screw coupling and to translation stage member 220 at its periphery so that, as threaded shaft 252 is rotated by linear drive motor 258, lead screw drive nut 254 moves axially along threaded shaft 252 which in turn moves translation stage member 220 and ultimately print head 500 axially along vacuum imaging drum 300.

In a laser thermal image processing apparatus, as the vacuum imaging drum spins, the print head moves in the "slow scan" direction, along the vacuum imaging drum in a path that is parallel to the longitudinal axis of the vacuum imaging drum. The linear motion system moves the print head in this slow scan direction, from a home position to the start-of-scan point (where it begins writing the image data) and across, to the opposite end of the drum. The combined movement of the print head in the slow scan direction and the vacuum imaging drum (in the "fast scan" direction) perpendicular to the motion of the print head causes the image to be written in a helix pattern about the vacuum imaging drum.

As best illustrated in FIG. 2, an annular-shaped axial load magnet 260*a* is integrally attached to the driven end of threaded shaft 252, and is in a spaced apart relationship with another annular-shaped axial load magnet 260*b* attached to a movable end plate 230 that is locked into position on lathe bed scanning frame 202 by set screw 228. Axial load magnets 260*a* and 260*b* are preferably made of rare-earth materials such as neodymium-iron-boron. A generally circular-shaped boss 262 part of threaded shaft 252 rests in the hollowed-out portion of annular-shaped axial load magnet 260*a*, and includes a generally V-shaped surface at the end for receiving a ball bearing 264. A circular-shaped insert 266 is placed in the hollowed-out portion of the other annular-shaped axial load magnet 260*b*, and includes an accurate-shaped surface on one end for receiving ball bearing 264, and a flat surface at its other end for receiving an end cap 268 placed over annular-shaped axial load magnet 260*b* and attached to movable end plate 230 for protectively covering annular-shaped axial load magnet 260*b* and providing an axial stop for lead screw 250. Circular shaped insert 266 is preferably made of material such as Rulon J or Delrin AF, both well known in the art.

Lead screw 250 operates as follows. Linear drive motor 258 is energized and imparts rotation to lead screw 250, as indicated by the arrows, causing lead screw drive nut 254 to move axially along threaded shaft 252. Annular-shaped axial load magnets 260*a* and 260*b* are magnetically attracted to each other which prevents axial movement of lead screw 250. Ball bearing 264, however, permits rotation of lead screw 250 while maintaining the positional relationship of annular-shaped axial load magnets 260, i.e., slightly spaced apart, which prevents mechanical friction between them while permitting threaded shaft 252 to rotate.

Print head 500 travels in a path along vacuum imaging drum 300, while being moved at a speed synchronous with vacuum imaging drum 300 rotation and proportional to the width of writing swath. The pattern that print head 500 transfers to thermal print media 32 along the vacuum imaging drum 300, is a helix.

Figure 3:
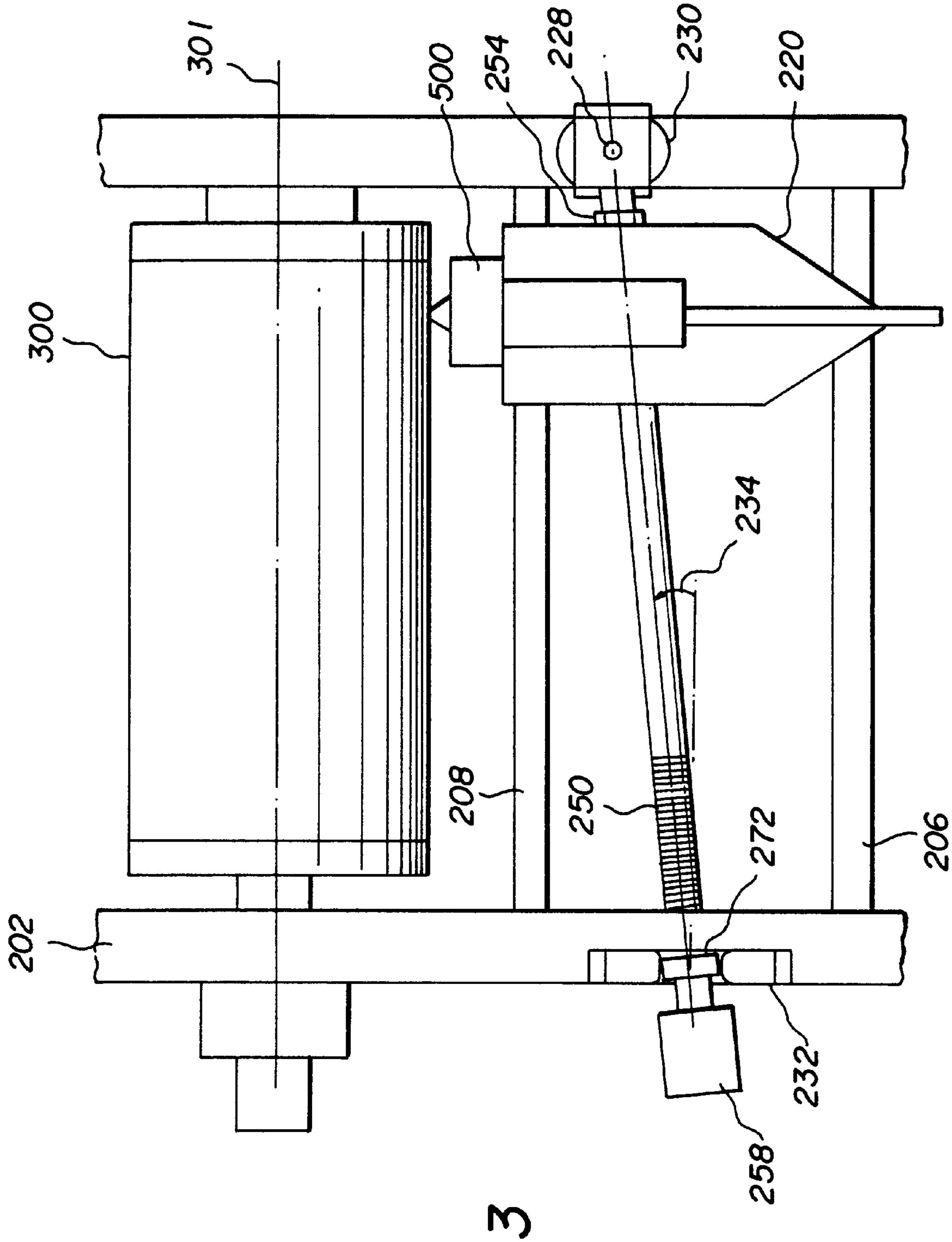
FIG. 3 is a top view showing the relationship of the lead screw and print head traversal mechanism to the front and rear translation bearing rods and to the writing drum, with the lead screw angle offset from parallel.

As represented in the top view of FIG. 3, angular adjustment of lead screw 250 relative to vacuum drum 300 axis 301 is set at the drive end, where lead screw 250 is mounted on lathe bed scanning frame 202. An adjustable collar 232 that retains radial bearing 272 is bolted into position on lathe bed scanning frame 202. This allows this end of lead screw 250 to be moved along frame 202 so that lead screw 250 can be adjusted to be at some angle other than a right angle relative to frame 202. This means that lead screw 250 is out of parallel with respect to front translation rod 208 by offset angle 234. At the same time, however, translation stage member 220 still moves in a path parallel to the drum axis. Only lead screw 250 itself is out of parallel. As a result, translation stage member 220 moves parallel to vacuum imaging drum 300 at a speed that is proportional to the speed that translation stage member 220 would have if lead screw 250 were parallel with respect to the front translation rod 208. The new speed (that is, with lead screw 250 at an angle) is the product of the baseline speed (that is, the speed if lead screw 250 were in parallel) times the cosine of the offset angle 234. (For example, for a 1° angle offset from parallel, the speed of the translation stage member 220 would equal 0.9998 times the baseline speed, since 0.9998 is the approximate cosine of a 1° angle.)

Figure 4:
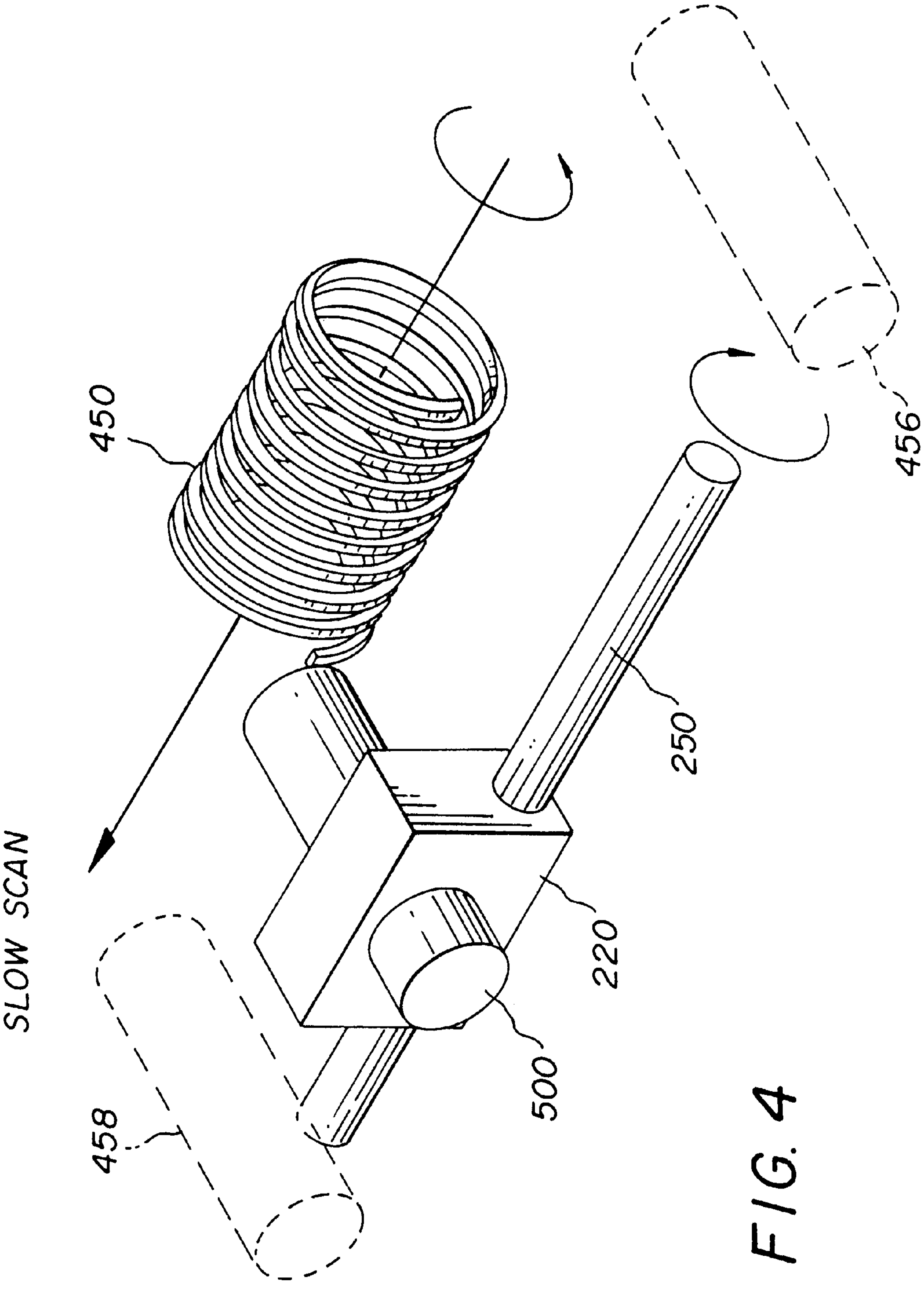
FIG. 4 represents the overall writing pattern that is effected by the print head translation drive as it writes and moves in its path along the rotating writing drum.

Referring to FIG. 4, print head 500 writes with multiple lasers at a time, forming a writing swath 450 that images in a continuous helix. As vacuum imaging drum 300 rotates, print head 500 is moved along from its start position 456 at one end of vacuum imaging drum 300 to its end position 458 at the other end of vacuum imaging drum 300 by translation stage member 220.

Figure 5:
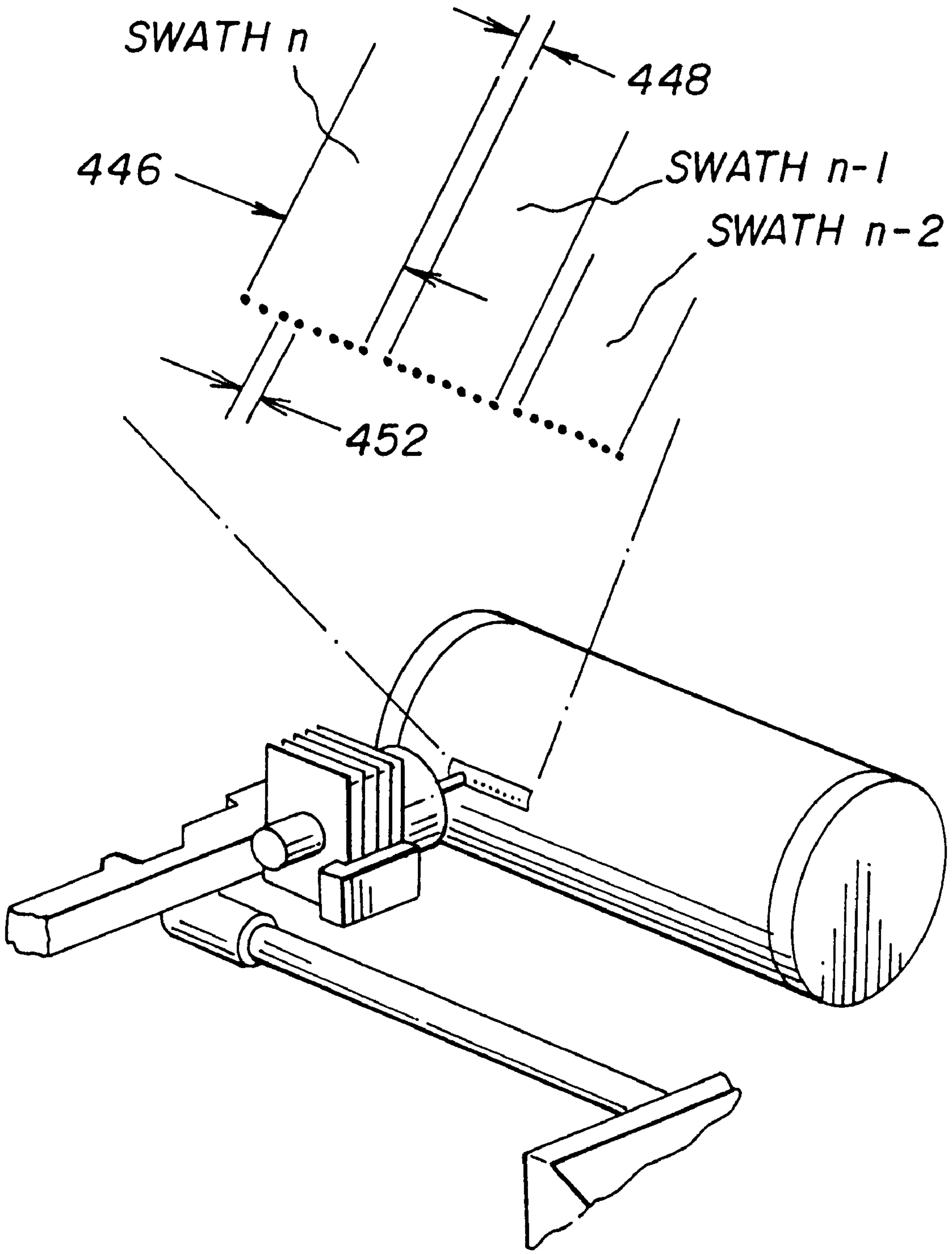
FIG. 5 shows the pixel-to-pixel and swath-to-swath relationships for imaging using a writing drum with print head traversal in the manner described.

FIG. 5 shows how the pixel-to-pixel distance 452 and swath-to-swath distance 448 are related. Any change in pixel-to-pixel distance 452 will affect swath width 446 (unless a different number of writing lasers are used and the same swath width 446 is maintained). Any change to swath width 446 requires a corresponding change to the traversal speed of print head 500 so that the distance between adjacent swaths in the helix is the same as the pixel-to-pixel distance 452. (Otherwise, banding can occur in the output image.)

Figure 6B:
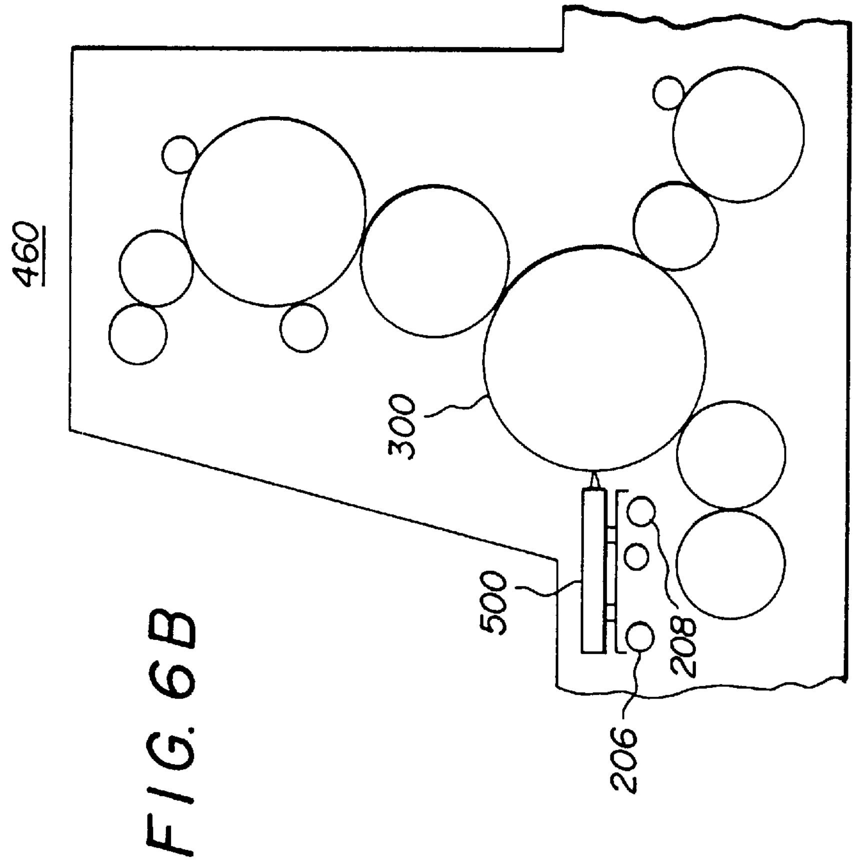
FIG. 6 is a side view showing one arrangement with multiple imaging stations on the same image processing apparatus.
Figure 6A:
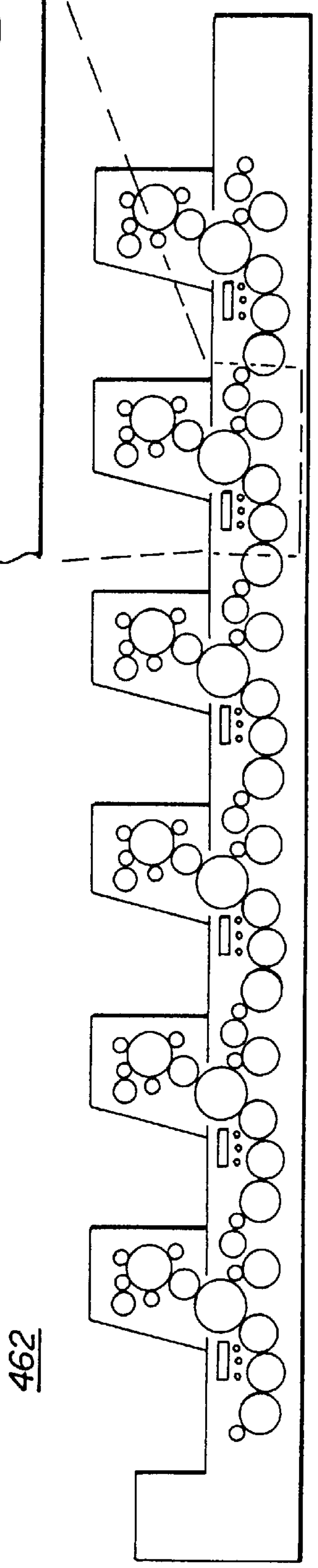

FIG. 6 shows one possible arrangement with several imaging stations built into a multiple-station image processing apparatus 462. Each station 460 has its own print head 500 and vacuum imaging drum 300 with the corresponding support components noted in the above detailed description. For such an apparatus, the media being imaged would be transported from station 460 to station 460, with each station 460 imaging with a different color.

The invention has been described with reference to the preferred embodiment thereof. However, it will be appreciated and understood that variations and modifications can be effected within the spirit and scope of the invention as described herein above and as defined in the appended claims by a person of ordinary skill in the art without departing from the scope of the invention. For example, the invention is applicable to any imaging apparatus that uses a lead screw for print head positioning. The movable end of the lead screw can be moved in any direction to provide the necessary offset from parallel, allowing this method to be used where space is at a premium. The imaging surface may be a drum as described, or any other suitable surface such as a web or platen; curved or flat.

What is claimed is:

1. An image processing apparatus for writing images to a media comprising:

an imaging surface;

a print head; and a lead screw adapted to move said print head in relation to said surface, said lead screw having a first end pivotally attached to a frame and a second end movable with respect to said imaging surface in an arc about the first end of the lead screw.

2. An image processing apparatus as in claim 1 wherein:

said imaging surface is curved;

said lead screw has an axis of rotation; and said second end of said lead screw is movable perpendicular to the axis of rotation of the lead screw.

3. An image processing apparatus as in claim 1 wherein said second end of said lead screw is movable in a plane parallel to said imaging surface.

4. An image processing apparatus as in claim 1, further comprising guide rods upon which the print head moves, said guide rods being parallel to the imaging surface, and wherein the lead screw is offsetable from parallel to the guide rods to achieve variable translation speeds.

5. A method for adjusting a translation speed of a movable print head as in claim 1, said method comprising:

providing an imaging surface, print head, and lead screw according to claim 1, wherein the imaging surface has a printing direction and the lead screw has an axis of rotation;

mounting the lead screw so that the axis of said lead screw is adjustably offset from parallel to said printing direction of the imaging surface, allowing a number of possible print head translation speeds with no change to drive speed of the lead screw.

6. A method for adjusting a translation speed of a movable print head as in claim 1, said method comprising:

providing an imaging surface, print head, and lead screw according to claim 1, wherein the imaging surface has a printing direction and the lead screw has an axis of rotation;

mounting the lead screw so that the axis of said lead screw is adjustably changeable to a selected angle over a range of angles offset from parallel to said printing direction of the imaging surface, so that a print head translation speed can be finely tuned to an exact value based on the selected angle.

7. A method for adjusting for swath-to-swath dimensional changes of image processing apparatus having a movable print head as in claim 1, said method comprising:

providing an imaging surface, print head, and lead screw according to claim 1, wherein the imaging surface has a printing direction and the lead screw has an axis of rotation;

mounting the lead screw so that the axis of said lead screw is adjustably changeable to a selected angle over a range of angles offset from parallel to said printing direction of the imaging surface, so that a print head translation speed can be finely tuned to an exact value based on the selected angle.

8. A method for adjusting printing resolution of image processing apparatus having a movable print head as in claim 1, said method comprising:

providing an imaging surface, print head, and lead screw according to claim 1, wherein the imaging surface has a printing direction and the lead screw has an axis of rotation;

mounting the lead screw so that the axis of said lead screw is adjustably changeable to a selected angle over a range of angles offset from parallel to said printing direction of the imaging surface, so that a print head translation speed can be finely tuned to an exact value based on the selected angle.

9. A method for adjusting for improving consistency of resolution machine-to-machine or station-to-station of image processing apparatus having a movable print head as in claim 1, said method comprising:

providing an imaging surface, print head, and lead screw according to claim 1, wherein the imaging surface has a printing direction and the lead screw has an axis of rotation;

mounting the lead screw so that the axis of said lead screw is adjustably changeable to a selected angle over a range of angles offset from parallel to said printing direction of the imaging surface, so that a print head translation speed can be finely tuned to an exact value based on the selected angle.

* * * * *